(12) United States Patent
Kobayashi et al.

(10) Patent No.: US 6,444,300 B1
(45) Date of Patent: Sep. 3, 2002

(54) J-ASSOCIATION BODY ORIENTATED DISPERSION FILM AND A METHOD FOR PRODUCING THE SAME

(75) Inventors: Takayoshi Kobayashi, Mitaka; Kazuhiko Misawa, Tokyo, both of (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/658,020

(22) Filed: Sep. 13, 2000

(30) Foreign Application Priority Data

Sep. 17, 1999 (JP) .......................................... 11-263807
Apr. 26, 2000 (JP) ....................................... 2000-125254

(51) Int. Cl.⁷ .................................................. B32B 7/02
(52) U.S. Cl. ...................................................... 428/220
(58) Field of Search ......................................... 428/220

*Primary Examiner*—Edward J. Cain
(74) *Attorney, Agent, or Firm*—Oliff & Berridge, PLC

(57) ABSTRACT

A cyanine pigment and a polyvinylalcohol are dissolved into a water to make a mezzo-J-association body dispersed solution. Then, the mezzo-J-association body dispersed solution is maintained at a high viscosity by holding the solution at a given temperature. Subsequently, the mezzo-J-association body dispersed solution is dropped onto a given substrate and thereafter, rubbed. Thereby, the J-association body oriented dispersion film having the J-association bodies composed of the associated and oriented cyanine pigments in polarization can be obtained.

16 Claims, 1 Drawing Sheet

J-ASSOCIATION BODY ORIENTATED DISPERSION FILM AND A METHOD FOR PRODUCING THE SAME

BACKGROUND OF THE INVENTION

1) Field of the Invention

This invention relates a J-association body oriented dispersion film and a method for the same, more particular a J-association body orientated dispersion film preferably usable for a secondary or tertiary non-linear optical element and a method for producing the same.

2) Description of the Prior Art

When mezzo-J-association bodies having giant electrostatic multipoles are associated in its several ten or over molecules and polarized in one orientation, a J-association body oriented dispersion film having an extremely giant electric dipole can be obtained. Then, when such a J-association body orientated dispersion film is applied for an optical element, the element has large non-linear characteristics due to the giant electric dipole, so the J-association body oriented dispersion film is expected to be used in a secondary harmonic wave-generating element or a optical modulation element.

As of now, as the J-association body orientated dispersion film, only a Langmuir Blodget film (LB film) is known.

The LB film is made by, what is called, a Langmuir Blodget method (LB method) as follows: A material having hydrophobic groups and hydrophilic groups such as cyanine pigment is floated on a water surface and then, the thus obtained films aligning on the water surface, each having a thickness of one molecular layer, are laminated one by one.

However, when the J-association body oriented dispersion film is made by the LB method, it becomes non-uniform and unstable, so that only a LB film having several laminated molecular layers of mezzo-J-association body can be obtained. Thus, the J-association body oriented dispersion film can not have a giant electric dipole impractically. Consequently, a J-association body orientated dispersion film usable for a non-linear optical element is not obtained up to now.

SUMMARY OF THE INVENTION

It is an object of the present invention to provide a J-association body oriented dispersion film having a giant electric dipole, preferably usable for a nonlinear optical element and to provide a method for producing the dispersed film.

This invention relates to a J-association body oriented dispersion film comprising a matrix and oriented mezzo-J-association bodies in polarization having giant electrostatic multipoles, respectively in the matrix.

This invention relates to a method for producing a J-association body oriented dispersion film comprising the steps of:

preparing a mezzo-J-association body dispersed solution having a high viscosity in which mezzo-J-association bodies, each having a giant electrostatic multipoles, are incorporated, and rubbing the mezzo-J-association body dispersed solution to orient the mezzo-J-association bodied in polarization in a matrix.

A preferred producing method of the present invention comprises the steps of:

preparing a mezzo-J-association body dispersed solution having a high viscosity, composed of water, aqueous polymer and mezzo-J-association body which are dissolved in the water, dropping the mezzo-J-association body dispersed solution on a substrate, and rubbing the dropped dispersion solution to orient the mezzo-J-association body in polarization in the matrix made of the aqueous polymer.

This inventors have intensely studied to obtain a J-association body oriented dispersion film having several ten or over oriented molecular layers of mezzo-J-association body. As a result, they have found that a mezzo-J-association body dispersed solution having a high viscosity is made and thereafter, rubbed to make the above J-association body oriented dispersion film.

That is, an aqueous polymer and a cyanine pigment as an ionic organic pigment were dissolved into a water to make a mezzo-J-association body dispersed solution having several ten associated molecules of the cyanine pigment constituting a mezzo-J-association body. Then, the dispersed solution was dropped onto a glass substrate with maintained at its high viscosity, and strongly rubbed by another glass substrate. As a result, a J-association body oriented dispersion film as above-mentioned can be obtained.

It is never unpredictable from the conventional LB method that only by rubbing the mezzo-J-association body dispersed solution maintained at a high viscosity, the J-association body oriented dispersion film having several ten or over associated molecular layers of the mezzo-J-association body can be obtained.

FIG. 1 shows an electric field modulation spectrum and a primary and secondary differential graphs of an absorption spectrum in an orientation direction in the J-association body oriented dispersion film according to the present invention when an electric field of 10 kV/cm is applied to the dispersed film. FIG. 2 shows an electric field modulation spectrum and a primary and secondary differential graphs of an absorption spectrum of a J-association body dispersed film made of, without rubbing and polarizing, a mezzo-J-association body dispersed solution when an electric field of 10 kV/cm is applied to the dispersed film.

In these figures, the solid line designates the electric field modulation spectrum, the dot line the primary differential graph, and the dashed line the secondary differential graph.

The J-association body oriented dispersion film is made by laminating the cyanine pigment to constitute the mezzo-J-association body in the matrix made of polyvinyl alcohol.

From the proportional coefficients in FIG. 1 and 2 between the electric field modulation spectrum and the secondary differential graph of the absorption spectrum, it is figured out that the J-association body dispersed film which is not polarized in FIG. 2 has an electric dipole of 0.27 debye and the J-association body oriented dispersion film which is polarized in FIG. 1 has an electric dipole of 88 debye. That is, the J-association body oriented dispersion film according to the present invention has a giant electric dipole.

Moreover, from the ratio of the proportional coefficients in FIGS. 1 and 2 between the electric field modulation spectrum and the primary differential graph, the J-association body oriented dispersion film has about 60 associated molecules of the cyanine pigment. That is, since in the J-associated body oriented dispersion film, the cyanine pigments associates in about 60 molecules, the dispersion film can have the above giant electric dipole.

The J-association body oriented dispersion film according to the present invention represents an extremely large optical non-linear characteristics due to the changes of its giant electrostatic dipole and polarizability. Consequently, the J-association body oriented dispersion film is extremely usable for a secondary non-linear optical element such as a second harmonic wave-generating element or a tertiary non-linear optical element such as a non-linear switch.

Hereupon, the "J-association body" means an associated body of several ten-thousand molecules from several molecules, and is founded by E.E. Jelly in 1936.

Moreover, the "mezzo-J association body" means an associated body of several ten molecules from several molecules.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
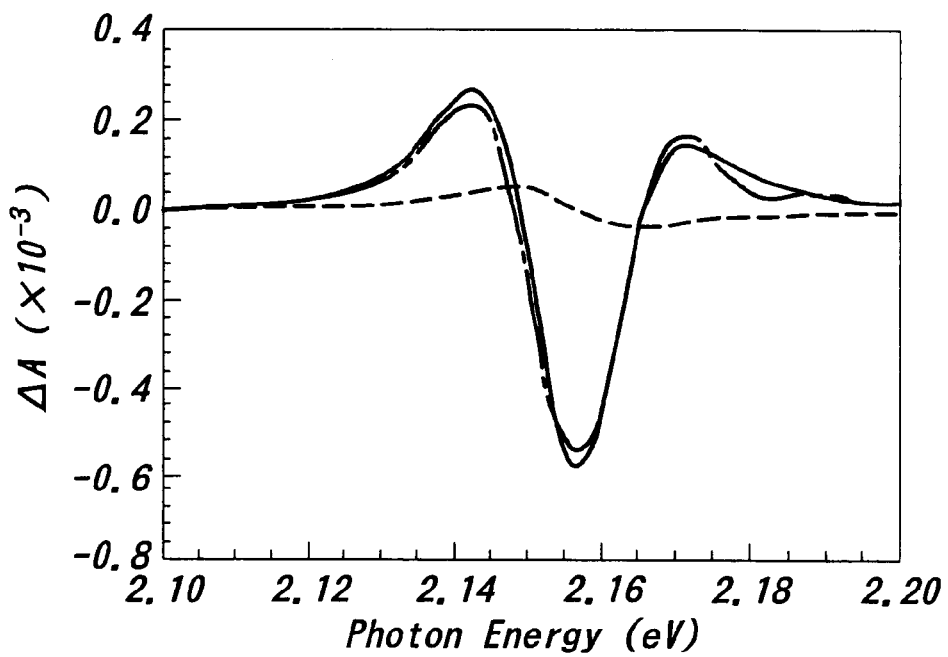
FIG. 1 is a view showing an electric field modulation spectrum (upper side) and a primary and secondary differential graphs of an absorption spectrum (lower side) in the J-association body oriented dispersion film according to tie present invention.

The invention will be described in detail as follows:

The J-association body oriented dispersion film of the present invention is required to have oriented mezzo-J-association bodies in polarization. It is desired that the oriented J-association body in polarization in the J-association body oriented dispersion film has 50–10000 molecules, particularly 1000–10000 molecules to constitute the electric dipole in the dispersion film. As a result, the J-association body oriented dispersion film can have an extremely large electric dipole and represent large optical non-linear characteristics.

Only if the J-association body oriented dispersion film can have a giant electric dipole by polarization in one orientation, the kind of the J-association body is not restricted. However, the J-association body is preferably composed of an ionic organic pigment.

Since the ionic organic pigment has a giant electric dipole therein, the J-association body composed of the oriented mezzo-J-association bodies in polarization in which the ionic organic pigments associates can have an extremely giant electric dipole. Therefore, the J-association body oriented dispersion film can be obtained.

In this case, the ionic organic pigment may preferably have porphyrin substitution product or cyanine pigment substitution product.

The porphyrin substitution product has a radical to be easily ionized such as sulfonic acid group, carboxylic acid group, and the cyanine pigment substitution product is easily ionized because of its resonance structure. As a result, these substitution products have extremely giant multipoles in the ionic organic pigments.

Concretely, the cyanine pigment, a porphyrin derivative, a squarrium derivative, a fulgide derivative, which are organic pigments, are exemplified. Of the organic pigments, the cyanine pigment, the porphyrin derivative, the squarrium derivative are preferably used because in a preferred producing method of the J-association body oriented dispersion film of the present invention as described later, temperature control in orientation treatment such as rubbing can be easily performed.

The kind of the matrix constituting the J-association body oriented dispersion film of the present invention is not restricted. However, an aqueous polymer such as polyvinylalcohol, polyvinylcabazole, a polyethlene glycol, etc. is preferably used as the material constituting the matrix. Of the aqueous polymer, the polyvinylalcohol is more preferably used. By using the polyvinyl-alcohol, the J-association body oriented dispersion film of the present invention can be easily made by the preferred producing method of the present invention using the rubbing treatment as described later.

A method for producing the J-association body oriented dispersion film of the present invention is not restricted, but the dispersed film is preferably made by the method using the rubbing treatment in order to obtain the J-association body oriented dispersion film having a giant electric dipole by polarizing the mezzo-J-association bodies in one direction.

First of all, a polymer such as polyvinylalcohol to be a matrix and an ionic organic pigment such as a cyanine pigment constituting a J-association body are dissolved into a solvent perfectly to make a mezzo-J-association body dispersed solution. Then, by setting the dispersed solution to an appropriate temperature, the dispersed solution is maintained at a high viscosity. Subsequently, the J-association body dispersed solution having the high viscosity is dropped onto a given substrate and rubbed to polarize the mezzo-J-association body dispersed solution in one orientation. As a result, the J-association body oriented dispersion film of the present invention, having the oriented mezzo-J-association bodies in polarization, can be obtained.

In the case of making the J-association body oriented dispersion film by the above method, the size of the J-association body constituting the J-association body oriented dispersion film is determined by the association degree of the mezzo-J-association body. The association degree of the mezzo-J-association body can be controlled by the concentration in the solution of the material such as the ionic organic pigment constituting the J-association body.

That is, for increasing the association degree of the mezzo-J-association body, the concentration of the material is increased, and for decreasing the association degree of the mezzo-J-association body, the concentration of the material is decreased.

For example, in using the cyanine pigment as the material constituting the J-association body and the polyvinylalcohol as the matrix constituting the J-association body oriented dispersion film, the concentration of the cyanine pigment in the mezzo-J-association solution is set to 1 g/L to 20 g/L. As a result, the mezzo-J-association body dispersed solution having the associated the cyanine pigments as the mezzo-J-association in 50 to 10000 molecules can be obtained.

Then, by rubbing the mezzo-J-association body, the associated cyanine pigments are polarized in one orientation, and thereby, the J-association body oriented dispersion film of the present invention having the oriented cyanine pigments in polarization to constitute the J-association bodies can be obtained.

The solvent usable in the above producing process is not particularly restricted only if it can dissolve the materials constituting the J-association body and constituting the matrix, respectively. However, in the case of using the above aqueous cyanine pigment constituting the J-association body and using an aqueous polymer such as polyvinylalcohol constituting the matrix, a water may be used as the solvent. As a result, the producing method can be easily performed.

Moreover, the rubbing in the above method is preferably carried out by using a plate made of the same material as that of the substrate. Thereby, the J-association body oriented dispersion film of the present invention can have uniformly oriented J-association bodies in polarization in its thickness direction.

The substrate may be made of glass, quartz, silicon.

Example:

This invention will be concretely described on the following example, but is not restricted to that example.

In this example, the J-association body oriented dispersion film was made by the above producing method of the present invention using the rubbing. First of all, 200 mg of polyvinylalcohol was put into a container in which 1 mL of water was charged. Then, the container was set on a heater with a thermoregulator, and the water in the container was heated to 100° C. and stirred to dissolve the polyvinylalcohol perfectly.

Next, 8 mg of cyanine pigment was put into the thus obtained polyvinylalcohol water solution. Then, the solution was heated to 130° C. by the heater and stirred to dissolve the cyanine pigment perfectly. Herein, the concentration of the cyanine pigment in the water solution was 8 g/L.

Subsequently, the thus obtained water solution was dropped onto a glass substrate and the dropped solution was rubbed at the above solution's temperature to obtain a J-association dispersed film. Hereupon, the rubbing was carried out once in one direction by using a plate glass similar to the glass substrate.

The electric field modulation spectrum and the primary and secondary differential graphs of the absorption spectrum in the obtained J-association body dispersed film were measured in its orientation direction, and depicted in FIG. 1.

Figure 2:
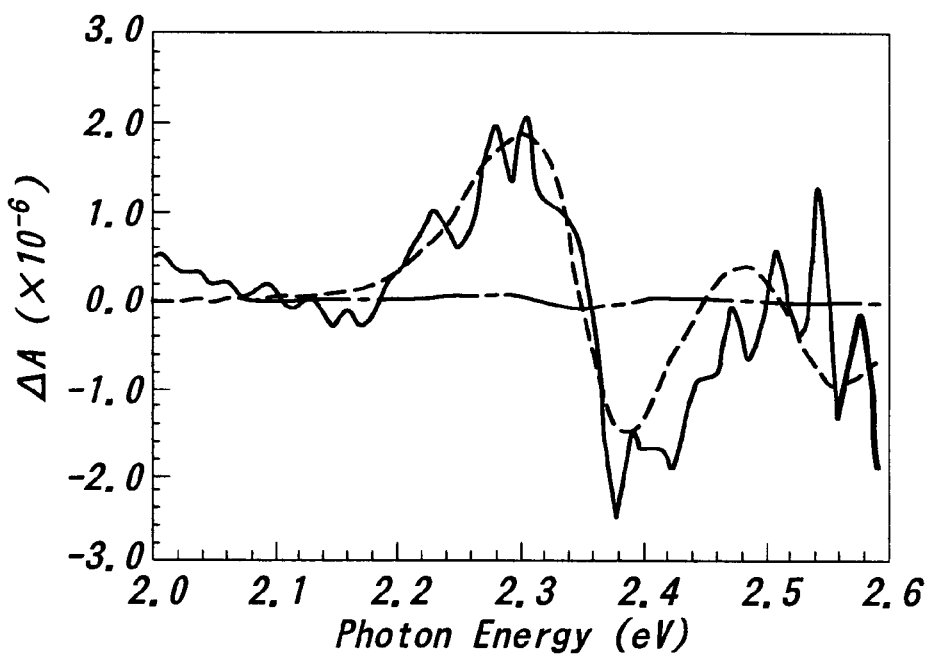
FIG. 2 is a view showing an electric field modulation spectrum (upper side) and a primary and secondary differential graphs of an absorption spectrum (lower side) in a J-association body dispersed film which is not polarized in one orientation.

Moreover, the electric field modulation spectrum and the primary and secondary differential graphs of the absorption spectrum of the J-association body dispersed film before the rubbing were also measured, and depicted in FIG. 2.

From the proportional coefficients in FIG. 1 and 2 between the electric field modulation spectrum and the secondary differential graph of the absorption spectrum, it is figured out that the J-association body dispersed film which is not polarized in one direction in FIG. 2 has an electric dipole of 0.27 debye and the J-association body oriented dispersion film which is polarized in one direction in FIG. 1 has an electric dipole of 88 debye. That is, it is turned out that the J-association body dispersed film in this example has a giant electric dipole through the orientation of the cyanine pigment in polarization.

Moreover, from the ratio of the proportional coefficients in FIGS. 1 and 2 between the electric field modulation spectrum and the primary differential graph, the J-association body oriented dispersion film of this example has about 60 associated molecules of the cyanine pigment.

Although the present invention was described in detail with reference to the above examples, this invention is not limited to the above disclosure and every kind of variation and modification may be made without departing from the scope of the present invention.

As is explained above, according to the present invention, the J-association body oriented dispersion film having a giant electric dipole can be obtained by the above extremely simple method. The J-association body oriented dispersion film has an extremely large optical non-linear characteristics, and thereby, can be preferably used for a non-linear optical element such as a secondary or a tertiary non-linear optical element.

What is claimed is:

1. A J-association body oriented dispersion film comprising a matrix and oriented mezzo-J-association bodies, each having 50–10000 molecules, in the matrix.

2. A J-association body oriented dispersion film as defined in claim 1, wherein the J-association bodies in the J-association body oriented dispersion film are composed of ionic organic pigments, respectively.

3. A J-association body oriented dispersion film as defined in claim 2, wherein the ionic organic pigment is at least one selected from the group consisting of cyanine pigment, porphyrin derivative, squarrium derivative.

4. A J-association body oriented dispersion film as defined in claim 1, wherein the matrix is made of a polymer.

5. A J-association body oriented dispersion film as defined in claim 4, wherein the polymer is polyvinylalcohol.

6. A method for producing a J-association body oriented dispersion film comprising the steps of:
   preparing a mezzo-J-association body dispersed solution having a high viscosity in which mezzo-J-association bodies, each having 50–10000 molecules, are incorporated, and
   rubbing the mezzo-J-association body dispersed solution to orient the mezzo-J-association bodied in polarization in a matrix.

7. A method for producing a J-association body oriented dispersion film as defined in claim 6, wherein the matrix is made of an aqueous polymer.

8. A method for producing a J-association body oriented dispersion film comprising the steps of:
   preparing a mezzo-J-association body dispersed solution having a high viscosity, composed of water, aqueous polymer and mezzo-J-association body which are dissolved in the water,
   dropping the mezzo-J-association body dispersed solution on a substrate, and
   rubbing the dropped dispersion solution to orient the mezzo-J-association body in polarization in the matrix made of the aqueous polymer.

9. A method for producing a J-association body oriented dispersion film as defined in claim 6, wherein the J-association bodies in the J-association body oriented dispersion film are composed of ionic organic pigments, respectively.

10. A method for producing a J-association body oriented dispersion film as defined in claim 9, wherein the ionic organic pigment is at least one selected from the group consisting of cyanine pigment, porphyrin derivative, squarrium derivative.

11. A method for producing a J-association body-orientation dispersed film as defined in claim 7, wherein the aqueous polymer is polyvinylalcohol.

12. A method for producing a J-association body oriented dispersion film as defined in claim 7, wherein the oriented J-association bodies in polarization in the J-association body oriented dispersion film have 50–10000 molecules, respectively.

13. A method for producing a J-association body oriented dispersion film as defined in claim 8, wherein the oriented J-association bodies in polarization in the J-association body oriented dispersion film have 50–10000 molecules, respectively.

14. A method for producing a J-association body oriented dispersion film as defined in claim 7, wherein the oriented J-association bodies in the J-association body oriented dispersion film are composed of ionic organic pigments, respectively.

15. A method for producing a J-association body oriented dispersion film as defined in claim 8, wherein the oriented J-association bodies in the J-association body oriented dispersion film are composed of ionic organic pigments, respectively.

16. A method for producing a J-association body-orientation dispersed film as defined in claim 8, wherein the aqueous polymer is polyvinylalcohol.

* * * * *